United States Patent
Sauter et al.

[11] Patent Number: 6,056,448
[45] Date of Patent: May 2, 2000

[54] VERTICAL CAVITY SURFACE EMITTING LASER ARRAY PACKAGING

[75] Inventors: Gerald Francis Sauter, Eagan; Rick Clevie Stevens, Apple Valley; Kevin Jerome Thorson, Eagan, all of Minn.

[73] Assignee: Lockheed Martin Corporation, Bethesda, Md.

[21] Appl. No.: 09/061,120

[22] Filed: Apr. 16, 1998

[51] Int. Cl.$^7$ ...................................................... G02B 6/36
[52] U.S. Cl. ................... 385/92; 385/89; 385/93
[58] Field of Search ............................... 385/88–92, 135, 385/93, 94; 359/163

[56] References Cited

U.S. PATENT DOCUMENTS

| | | | |
|---|---|---|---|
| 4,840,451 | 6/1989 | Sampson et al. | 350/96.2 |
| 5,091,991 | 2/1992 | Briggs et al. | 385/82 |
| 5,436,997 | 7/1995 | Makiuchi et al. | 385/92 |
| 5,515,467 | 5/1996 | Webb | 385/88 |
| 5,590,232 | 12/1996 | Wentworth et al. | 385/92 |
| 5,631,988 | 5/1997 | Swirhun et al. | 385/89 |
| 5,761,358 | 6/1998 | Kuchenbecker et al. | 385/56 |
| 5,774,614 | 6/1998 | Gilliland et al. | 385/88 |
| 5,933,558 | 8/1999 | Sauvageau et al. | 385/88 |

*Primary Examiner*—Hemang Sanghavi
*Attorney, Agent, or Firm*—Glenn W. Bowen; Patrick M. Hogan

[57] ABSTRACT

A vertical cavity surface emitter array package for compiling optical data signals through an optical coupling connector is presented. The package includes the laser array that is mounted on a backing plate that has alignment holes in it, which receive alignment pins to align the array with the input end of the optical coupling connector. In one version of the package the input end of the optical coupling connector extends into the housing of the package and is aligned with the laser array. In a second version the optical coupling connector is extended to the housing and is aligned with optical fibers that project a feed-through assembly into alignment with a second optical coupling connector inside of the package, which in turn is aligned with the laser array. In a third embodiment an optical lens is aligned with the laser array and transmits optical data signals through a window insert in the housing of the package to the input end of the optical coupling connector.

6 Claims, 6 Drawing Sheets

CONVENTIONAL LENS

"COLLAPSED" LENS

BINARY LENS

VERTICAL CAVITY SURFACE EMITTING LASER ARRAY PACKAGING

The U.S. Government has an irrevocable, nonexclusive, non-transferable, paid-up license to practice, or have practiced, this invention for or on behalf of the United States and throughout the world, as provided for by the terms of Contract No. N00019-96-C-0112 awarded by the U.S. Navy.

FIELD OF THE INVENTION

This invention relates to optical array packaging for both vertical cavity, surface emitting, laser arrays and the corresponding photodiode detector array packaging.

BACKGROUND OF THE INVENTION

Vertical cavity, surface-emitting lasers (VCSEL), if properly packaged, can provide a cost effective laser array for the transmission of data signals. Prior laser array packages were often large in size, relatively expensive and required labor intensive active alignment. The present invention solves the above problems and allows optical transmitters to operate as high speed, parallel optical communication data links.

SUMMARY OF THE INVENTION

An optical data transmission package is provided that has a housing for transmitting optical signals that are generated inside of the housing of said package through an optical coupling connector that has an output end located externally of said housing and optical elements located internally of said housing. The package includes a printed circuit board with wiring paths positioned inside of the housing, which interconnect an electrical drive controller to a vertical cavity surface emitting laser array that is mounted on a backing plate, which has alignment holes. The alignment holes receive alignment rods to provide proper alignment of the output of the laser array with said output coupling connector in order to couple laser signals from the laser array through the output end of the output coupling connector. Fiducial marks are provided on the laser array to obtain proper alignment of the array on the backing plate relative to the alignment holes.

In a first embodiment of the invention the optical coupling connector has its input end located internally of the housing and has one or more openings in its input end for receiving the alignment rods.

In a second embodiment both the input and output ends of the optical coupling connector are located externally of the housing, and the input end is located adjacent to an output section of the housing. A fiber optic feed-through assembly is located in the output section of the housing which contains a plurality of optical fibers that are aligned to couple optical data signals from an inside end of said optical fibers to the input end of said optical coupling connector which is positioned adjacent to the outside end of said optical fibers.

A second optical coupling connector is positioned inside of the housing that has an input side and an output side for coupling optical data signals from the input side to the output side of the external optical coupling connector so that the output side of the second optical coupling connector is located adjacent to the inside end of said optical fibers, and the inside end of said second optical coupling connector has one or more openings therein for receiving the alignment rods.

In a third embodiment the input and output ends of the optical coupling connector are also located externally of the housing, and the input end is located adjacent to the output section of the housing.

An output structure has an optical window therein located in the output section of the housing for emitting optical signals to the input end of the external optical coupling connector, and a lens array is positioned between the window and the laser array. The output structure may have one or more alignment holes for receiving the alignment rods.

BRIEF DESCRIPTION OF THE DRAWINGS

The present invention is described by reference to the drawings in which.

DESCRIPTION OF THE PREFERRED EMBODIMENT

Figure 1:
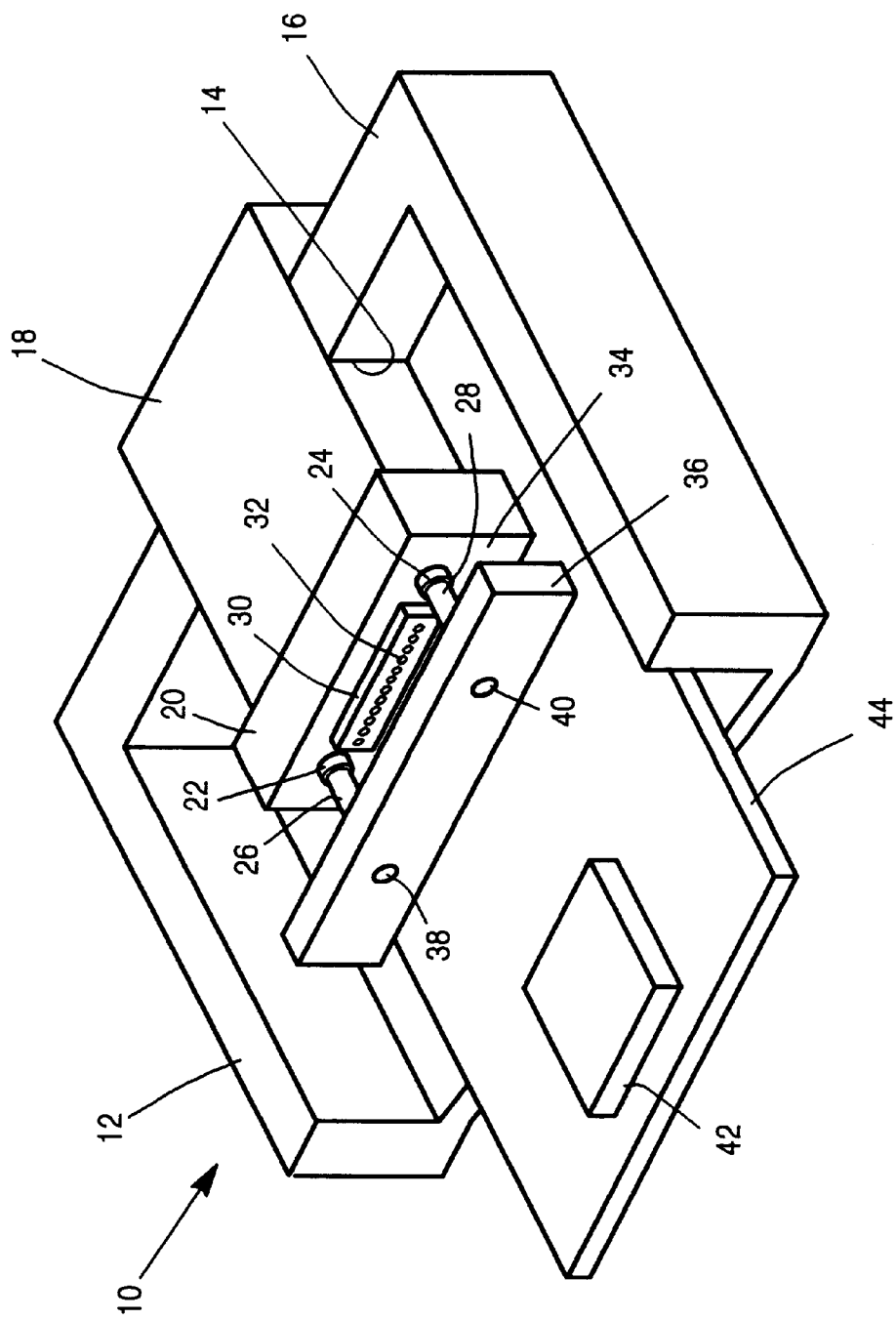
FIG. 1 is an exploded perspective view of an embodiment of the invention that shows a VCSEL package in which the top and back are removed to show a VCSEL chip that is interconnected to a printed circuit board and is coupled to a commercial MT connector that partially extends through the side-wall of the housing of the package.

A first embodiment of the invention is shown by reference to FIG. 1. The package 10 for the VCSEL laser array is enclosed in a housing 12 in which the top and the portion of the rear of the housing have been removed for clarity of illustration. An opening 14 is provided in the front wall 16 of the housing. This enables the insertion of a commercially available MT optical connector 18 into the opening 14 so that a substantial portion of the MT connector projects into the housing. The MT connector has an enlarged front block 20, which has a pair of blind holes 22, 24 into which the guide-pins 26 and 28, respectively, are inserted. The guide-pins ensure alignment between the optical input ports (not shown) of the optical connector that is located in the front block 20 and the optical elements that are optically coupled to each of these input ports.

The assembly 30 is an array of vertical cavity surface emitting lasers (VCSEL), which is positioned so that each of lasers 32 are aligned with a corresponding input port that runs along a horizontal line (not shown) in the front face 34 of the MT connector. The alignment of these lasers with the input ports of the MT connector is accomplished by means of the guide-pins 26 and 28, which also extend through a backing plate 36, which has the alignment holes 38, 40 through it in order to receive the guide-pins. In FIG. 1 it is noted that the VCSEL chip 30 is separated from the backing plate 36. However, when assembled, the VCSEL chip will be secured to the backing plate 36.

An electronic drive controller 42 for providing the appropriate signals to the VCSEL array is mounted on a printed circuit board 44 and is connected to the array by printed circuit wiring (not shown). Lasers on the VCSEL chip are also connected to the printed circuit wiring in a conventional manner by wire bonding from pads on the VCSEL chip to the wiring (not shown).

For environmentally sensitive applications, the MT connectors preferably are hermetically sealed in the housing. This may be readily accomplished if the MT connector is made of ceramic and ceramic glue is applied to accomplish the sealing. This, however, would increase the cost of the package since the commercial MT connector is constructed of plastic.

Figure 2:
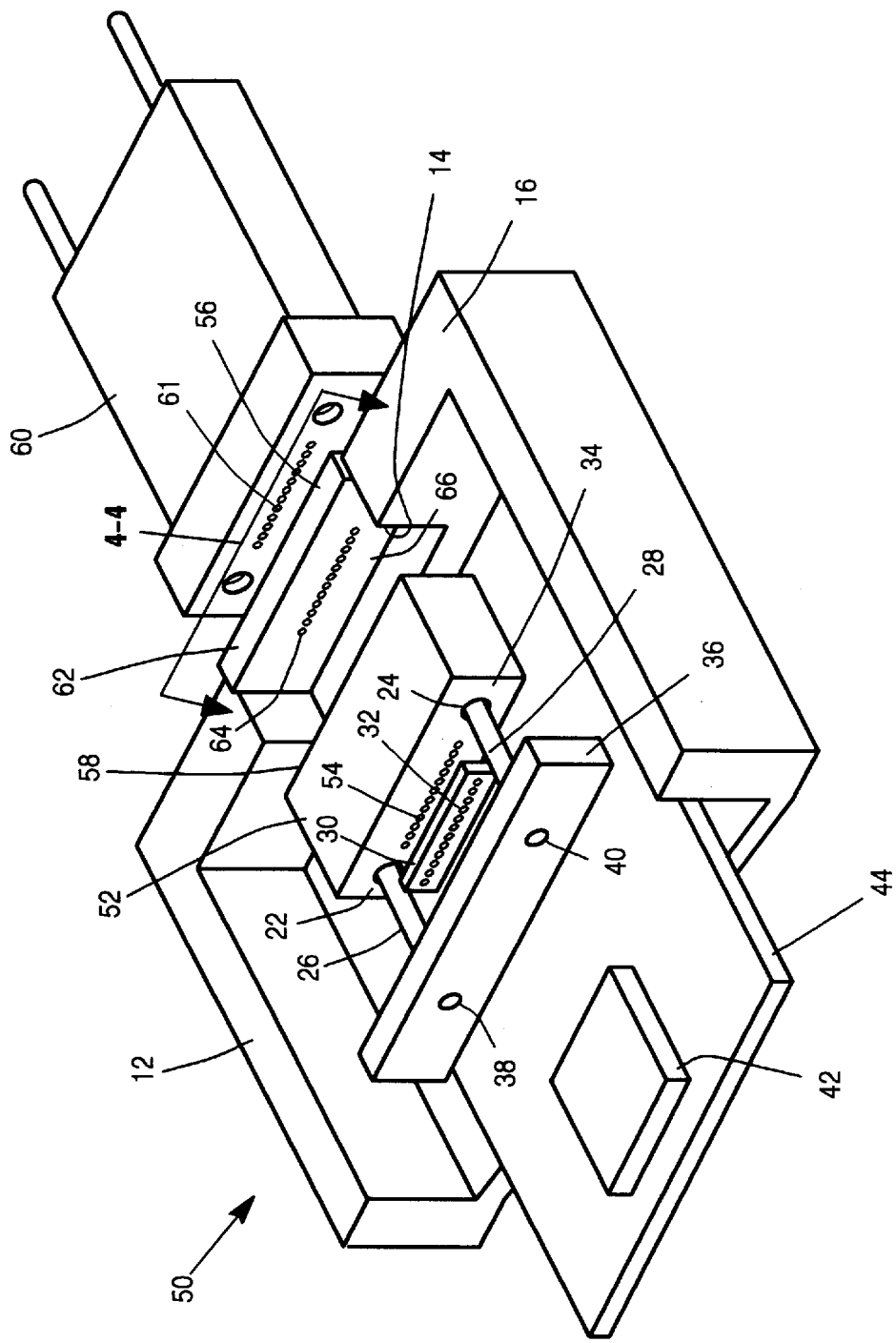
FIG. 2 is an exploded perspective view of an alternate version of a package with the cover and back-wall removed to show a VCSEL chip that is coupled to a modified MT connector that is optically coupled to a fiber optic feed-through assembly that is positioned in the side-wall of the package, which is in turn optically coupled to an external MT connector.

FIG. 2 shows an exploded view of a second embodiment of the present invention in which a number of elements are identical to those employed in FIG. 1. To the extent that such elements are common with those in FIG. 1, the same element numbers are used to describe the package. The package 50 of FIG. 2 has the same general housing structure as that of the embodiment of FIG. 1. The VCSEL chip 30, the backing plate 36 with the guide-pin holes 38 and 40, the electric drive controller 42 and the printed circuit board assembly 44 may be identical to the elements shown in FIG. 1.

Enclosed in the housing is a modified MT connector 52, which is shorter than a conventional MT connector and does not contain the front block 20. The modified MT connector 52, however, has the blind holes 22, 24 to receive the guide-pins 26, 28 which provide alignment between the VCSEL laser array 30, the input ports 54 on the front face 34 of the modified MT connector and the input ports 61 of the external connector 60, which is positioned adjacent to the outside surface 62 of the fiber optic feed-through assembly 56. The opening 14 in the front wall 16 of the housing 12 in this embodiment contains a fiber optic feed-through assembly 56. Although this is shown in an exploded view, when the package is assembled, the VCSEL chip 30 will be mounted on the backing plate 36, and the front end 58 of the modified MT connector 52 will be inserted into the opening 14 in proximity to the feed-through assembly 56.

Figure 4:
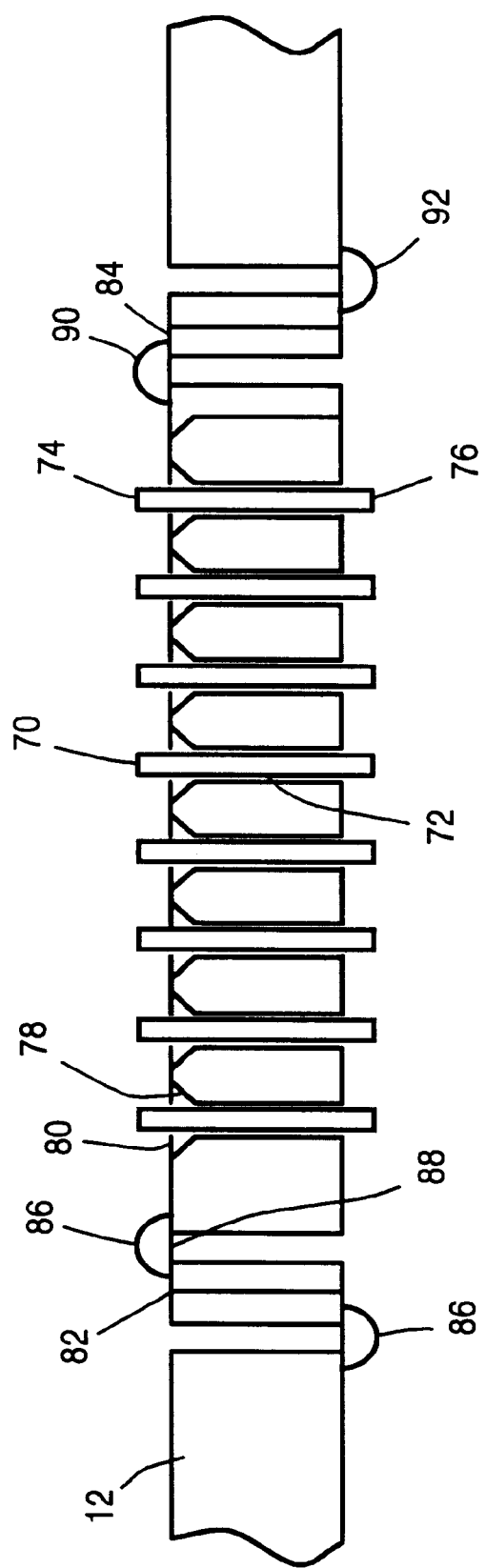
FIG. 4 is a cross-sectional view of the fiber optic feed-through assembly taken along the lines 4—4 of FIG. 2.

FIG. 4 is a cross-sectional view of the feed-through assembly 56 taken along the lines 4—4 of FIG. 2, which shows in greater detail this particular feed-through assembly construction. In that embodiment the fiber optics may be secured by gluing them into place within the feed-through assembly which may be made of Kovar. A number of optical fibers 70 are each inserted into one of the individual through-passageways 72. The individual through-passageways may be replaced by a slot cut in the Kovar. The areas between the through-passageways are formed as conical shapes to receive ceramic glue or other sealing material that will secure the fibers 70 in place. The opposite ends of the fibers 74,76 are threaded through the MT connectors 52,60, bonded to these MT connectors and are polished to receive and transmit optical signals.

In the illustrated example of FIG. 4, the housing is assumed to be aluminum in order to accommodate for the differential expansion and contraction of aluminum and Kovar in a hermetically sealed package. It is necessary to join the aluminum and the Kovar in an appropriate manner. One way of doing this would be to provide aluminum Kovar bimetalic shims 82,84 wherein the shaded portion of the shim represents aluminum, and the white portion represents Kovar. The shim is made by explosively bonding the two metals together. The package may then be sealed by laser welding components together at the welds 86,92.

If the feed-through assembly and the housing are of the same material, the bimetalic shim and laser welding is not necessary to take into account differences in expansion and contraction. An alternate way of securing the optical fibers would be to metalize the through-passageways and the optical fibers and to solder the optical fibers in place using conventional Pb—Sn solder.

Figure 3:
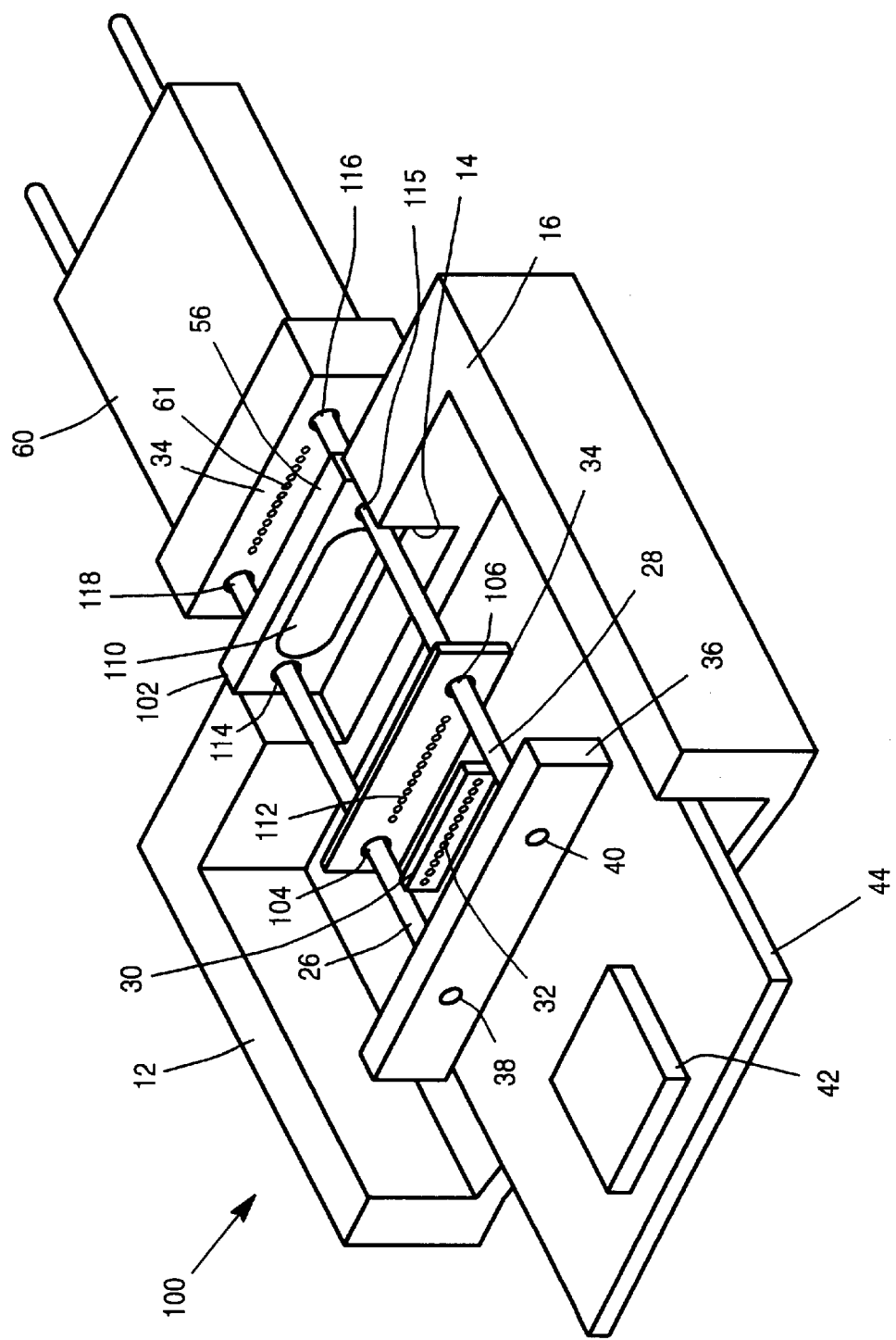
FIG. 3 is an exploded perspective view of a third embodiment of a VCSEL package with the top and the rear wall removed to show a VCSEL chip that is optically coupled to a binary optic lens array, which in turn is optically coupled to an external MT connector.

Turning now to FIG. 3 there is shown a third embodiment of the present invention. Similar elements in the embodiment will again retain the same element numbers as those in FIGS. 1 and 2. This embodiment is intended for use with an outside conventional MT coupler 60 with aligned input ports 61, as in FIG. 2. In this embodiment the modified MT connector 52, the Kovar fiber feed-through assembly and the fiber optic cables have been replaced so that the VCSEL array lasers transmit their outputs directly through a micro lens array 102, each lens of which is aligned with the optical fibers of an external MT connector 60. The lens array 102 has holes 104, 106 in it to receive the guide-pins 26, 28. The opening 14 in the front wall of the housing 16 holds a window insert 108 with a clear window 110 which allows the signals to be coupled from the lens 112 of the lens assembly 102. The window insert 108 also has holes 114 and 116 in it which receive the guide-pins 26, 28. The MT connector correspondingly has blind holes which receive the guide-pins 26, 28 respectively through the window insert 108 to align the lens 112 and the input ports (not shown) on the front face 34 of the MT connector.

Figure 5:
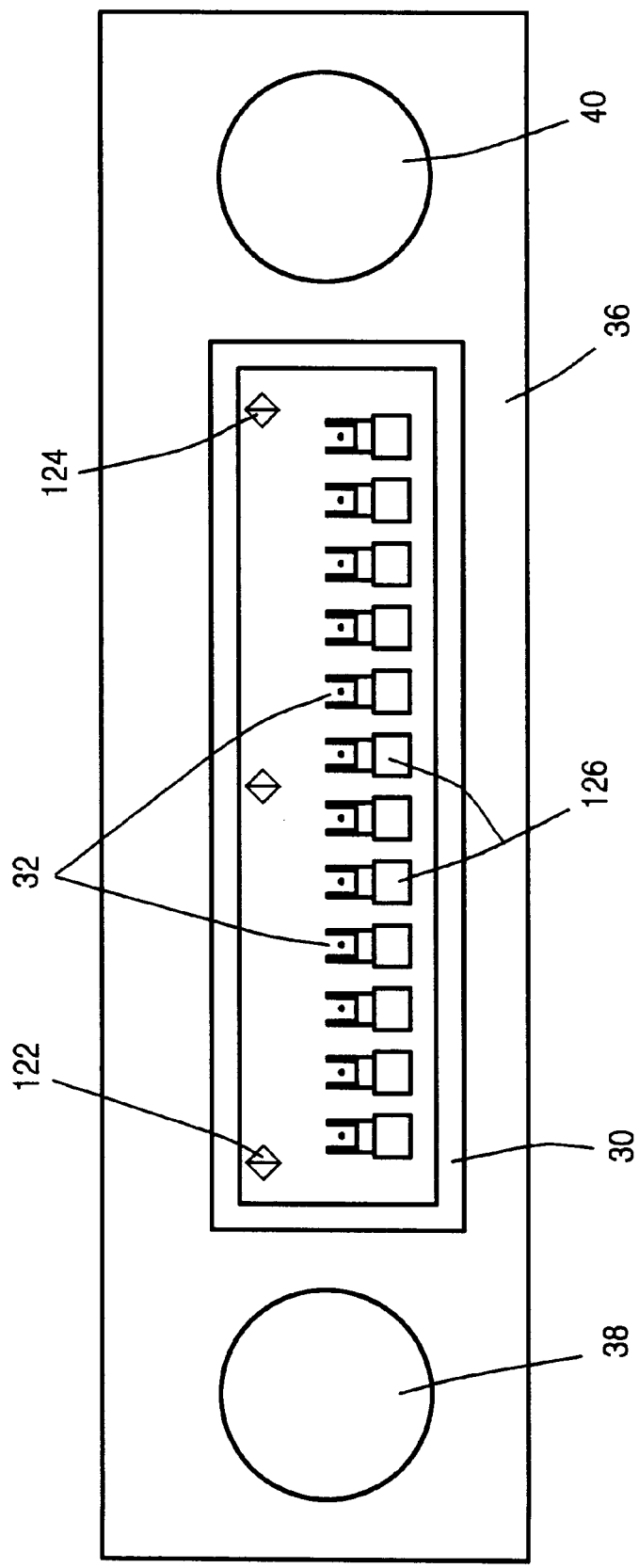
FIG. 5 is a top view of a VCSEL chip mounted on a backing plate, which is employed in the embodiments of FIGS. 1–3.

FIG. 5 shows the plan view of the VCSEL array of all of the embodiments of FIGS. 1–3 when it is secured to the backing plate 36. The VCSEL chip is located precisely on the backing plate 36 by means of the fiducial marks 122 and 124 by an automatic aligning machine. This precisely locates the array on the backing plate in relation to the alignment holes 38 and 40. The VCSEL array is first secured by soldering, or other suitable technique, to the backing plate, which also serves as a heat sink. An electrical connecting pad 126 is provided for each of the lasers, which are connected through circuit board wiring to the electrical driver, as in the other embodiments.

Figure 6A:
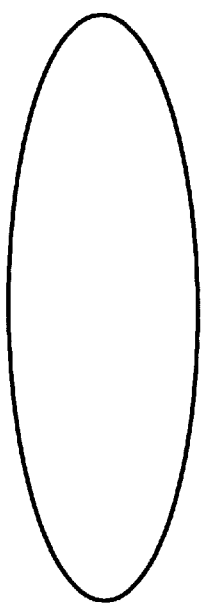
FIG. 6a is a side view of a conventional convex optic lens.
Figure 6B:
FIG. 6b is a side view of a collapsed optic lens which approximates a conventional lens with the defraction grading structures that form the ray-bending function.
Figure 6C:
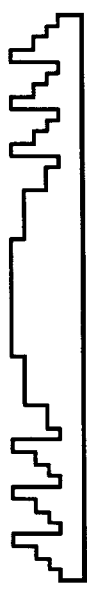
FIG. 6c is a side view of a binary optic lens, which is a stepped approximation to the collapsed surface of the lens of the FIG. 6b.

A conventional convex lens is shown in FIG. 5 to illustrate the development of a suitable lens array for the embodiment of FIG. 3. The binary lens of FIG. 6c is preferred for the lens array 102 and is constructed to approximate a collapsed lens, such as shown in FIG. 6b. In the lens of FIG. 6c defraction grating structures are provided to form the appropriate ray-bending function to properly align the output of a particular laser in VCSEL array 18 with the input of a particular optical fiber in an MT connector housing. The binary lens 6c is a binary step approximation to the collapsed lens of FIG. 6b. A binary lens array may be constructed by fabricating on a separate glass structure and then bonding the array to the window. Other methods to produce microlens arrays would be to etch or deposit thin film lens elements on optical windows or to diffuse material into a glass substrate that changes the index of refraction in a prescribed manner. A binary optic lens element may be obtained by modifying available commercial types of lens provided by several lens manufacturers. The binary lens array and its substrate may form the optical window as well. In this case the optical window/lens array is aligned in an opening made in the package sidewall and glass soldered in place. The lens array is aligned relative to the guide pins.

What is claimed is:

1. In an optical data transmission package having a housing for transmitting optical signals generated inside said housing of said package through an optical coupling connector that has an output end located externally of said housing and through optical elements located internally of said housing comprising:

(a) a printed circuit board comprising wiring paths positioned inside said housing, (b) an electrical drive controller electrically connected to said wiring paths on said printed circuit board and constructed to produce drive signals that are coupled over said wiring paths, (c) a vertical cavity surface emitting laser array electrically connected to said wiring paths on said printed circuit board and constructed to emit optical output signals in accordance with the drive signals supplied by said electrical drive controllers, (d) a backing plate secured to said laser array having one or more alignment holes therein, and (e) one or more alignment rods, each of which pass through a respective one of said alignment holes positioned to provide proper alignment of the output of said laser array with said output coupling connector in order to couple laser signals from said laser array through the output end of said output coupling connector, the improvement wherein both said input and output ends of said optical coupling connector, are located externally of said housing, which has an output section therein, said input end is located adjacent to said output section of said housing, and said optical data transmission package further comprises:

a fiber optic fed-through assembly located in said output section of said housing and containing a plurality of optical fibers aligned to couple optical data signals from an inside end of said optical fibers to the input end of said optical coupling connector, which is positioned adjacent to the outside end of said optical fibers, and a second optical coupling connector positioned inside said housing, having an input side and an output side for coupling optical data signals from said input side to said output side of said external coupling connector, wherein said output side of said second optical coupling connector is located adjacent to the inside end of said optical fibers, and said inside end of said second optical coupling connector has one or more openings therein fore receiving said one or more alignment rods.

2. In an optical data transmission package as claimed in claim 1, the further improvement comprising a plurality of fiducial marks on said laser array, wherein said laser array is located on said backing plate at a location that is relative to said holes and said fiducial marks.

3. In an optical data transmission package having a housing for transmitting optical signals generated inside said housing of said package through an optical coupling connector that has an output end located externally of said housing, and through optical elements located internally of said housing and through optical elements located internally of said housing comprising:

a. a printed circuit board comprising wiring paths positioned inside said housing, b. an electrical drive controller electrically connected to said wiring paths on said printed circuit board and constructed to produce drive signals that are coupled over said wiring paths, c. a vertical cavity surface emitting laser array electrically connected to said wiring paths on said printed circuit board and constructed to emit optical output signals in accordance with the drive signals supplied by said electrical drive controllers, d. a backing plate secured to said laser array having one or more alignment holes therein, and e. one or more alignment rods, each of which pass through a respective one of said alignment holes positioned to provide proper alignment of the output of said laser array with said output coupling connector in order to couple laser signals from said laser array through the output end of said output coupling connector, the improvement wherein both said input and output ends of said optical coupling connector are located externally of said housing, which has an output section therein, said input end of said optical coupling connector is located adjacent to said output section of said housing and said optical data transmission package comprises:

a structure having an optical window therein, which is located in said output section of said housing for emitting optical signals to the input end of said optical coupling connector, and a lens array positioned between said window and said laser array.

4. In an optical data transmission package as claimed in claim 3, the further improvement wherein said structure has one or more alignment holes therein for receiving said one of said alignment rods, and said optical coupling connector has one or more openings therein for also receiving said one or more of said alignment rods so as to align all of said laser array, said lens array and said input end of said optical coupling connector.

5. In an optical data transmission package as claimed in claim 4, the further improvement comprising a plurality of fiducial marks on said laser array, wherein said laser array is located on said backing place at a location that is relative to said holes and said fiducial marks.

6. In an optical data transmission package as claimed in claim 3, the further improvement comprising a plurality of fiducial marks on said laser array, wherein said laser array is located on said backing place at a location that is relative to said holes and said fiducial marks.

* * * * *